US012793740B1

(12) United States Patent
Sandoval-Castaneda et al.

(10) Patent No.: US 12,793,740 B1
(45) Date of Patent: Nov. 10, 2026

(54) MULTI-AGENT VIDEO EDITING SYSTEM

(71) Applicant: Adobe Inc., San Jose, CA (US)

(72) Inventors: Jose Marcelo Sandoval-Castaneda, Chicago, IL (US); Bryan Russell, San Francisco, CA (US); Fabian David Caba Heilbron, San Jose, CA (US); Josef Sivic, Prague (CZ)

(73) Assignee: Adobe Inc, San Jose, CA (US)

( * ) Notice: Subject to any disclaimer, the term of this patent is extended or adjusted under 35 U.S.C. 154(b) by 0 days.

(21) Appl. No.: 19/205,562

(22) Filed: May 12, 2025

(51) Int. Cl.
*G11B 27/031* (2006.01)
*G06F 16/735* (2019.01)
*G06F 16/738* (2019.01)
*G11B 27/10* (2006.01)

(52) U.S. Cl.
CPC .......... *G11B 27/031* (2013.01); *G06F 16/735* (2019.01); *G06F 16/739* (2019.01); *G11B 27/10* (2013.01)

(58) Field of Classification Search
CPC ............................... G06V 20/46; G06V 20/49
See application file for complete search history.

(56) References Cited

U.S. PATENT DOCUMENTS

2021/0110166 A1* 4/2021 Gunawardena ..... G06F 16/7844
2022/0198779 A1* 6/2022 Saraee ................ G06F 16/9535
2025/0110975 A1* 4/2025 Shea ................... G06F 16/3329
2025/0200825 A1* 6/2025 An ........................ G11B 27/031
2026/0037275 A1* 2/2026 Cyjon ....................... G06F 8/65

FOREIGN PATENT DOCUMENTS

WO WO-2024152802 A1 * 7/2024 ............. G10L 15/04

OTHER PUBLICATIONS

"Towards Visual-Prompt Temporal Answer Grounding in Instructional Video"—Li et al., IEEE Transactions on Pattern Analysis and Machine Intelligence, vol. 46, No. 12, Dec. 2024. (Year: 2024).*

(Continued)

*Primary Examiner* — Mainul Hasan
(74) *Attorney, Agent, or Firm* — Nicholson De Vos Webster & Elliott LLP

(57) ABSTRACT

Embodiments are disclosed for a multi-agent video editing system that includes neural network models trained to collaboratively generate a video timeline given a video collection and natural language text instructions. The method may include receiving an input including a video collection, a video timeline, and natural language text instructions including a query describing a requested video sequence. The method further includes generating, by a first neural network, an assessment of a similarity between the video timeline and the natural language text instructions, including recommended modifications to the video timeline. The method further includes modifying, by a second neural network, the video timeline using video clips from the video collection based on the recommended modifications. The process can be iteratively repeated until the modified video timeline satisfies the query in the natural language text instructions. The modified video timeline is then rendered to generate an output video sequence.

20 Claims, 9 Drawing Sheets

(56) References Cited

OTHER PUBLICATIONS

Argaw et al., "The Anatomy of Video Editing: A Dataset and Benchmark Suite for AI-Assisted Video Editing," Proceedings of Computer Vision—ECCV 2022: 17th European Conference, Part VIII, Oct. 23-27, 2022, pp. 201-218.

Wang et al., "LAVE: LLM-Powered Agent Assistance and Language Augmentation for Video Editing," arXiv:2402.10294v1 [cs. HC], Feb. 15, 2024, pp. 1-16.

Xiong et al., "Transcript to Video: Efficient Clip Sequencing from Texts," arXiv:2107.11851v2 [cs.CV], Nov. 20, 2023, 34 pages.

* cited by examiner

You are a video-editing agent trained to interact with text-based editing software. You have access to a set of functions, a timeline, which will be rendered at the end, a search engine, and a corpus of videos that you will use to assemble a video in the timeline. Your objective is to discover diverse and interesting tasks (that a human might give to an agent) by interacting with the editing software through the functions you are given.

Here is a list of tools that you have available to you:
{function definitions}

302

A video editing agent interacting with a text-based video editing software is given precise feedback by a human, which it carries out through a sequence of sub-tasks, where each sub-task (such as searching for videos, adding them to the timeline, moving around clips in the timeline, and removing videos from the timeline) changes the video to be rendered.

Each timeline contains information on the name of the file, a description of the visual contents of the video, its duration in seconds, the cinematographic shot type most prevalent in the video, and the type of motion observed.

You are given the initial timeline, the final timeline after all sub-tasks are carried out, and each intermediate change that each sub-task made to the starting timeline state.

Your objective is to guess the feedback that was given to the agent which led to modifying the original video timeline. Ensure your instruction is concrete and that every sub-task meaningfully contributes to fulfilling the instruction.

304

A video editing agent interacting with a text-based video editing software is given precise feedback by a human, which it carries out through a sequence of sub-tasks, where each sub-task (such as searching for videos, adding them to the timeline, moving around clips in the timeline, and removing videos from the timeline) changes the video to be rendered.

Each timeline contains information on the name of the file, a description of the visual contents of the video, its duration in seconds, the cinematographic shot type most prevalent in the video, and the type of motion observed.

You are given the initial timeline, the final timeline after all sub-tasks are carried out, and each intermediate change that each sub-task made to the starting timeline state. You are also given the original user feedback that led to modifying the original video timeline.

Your objective is to provide a score, from 1 to 5, of how well the feedback was incorporated in the actions carried out by the agent. Only give a score of 5 if the changes perfectly reflect the feedback provided by the user and in the fewest possible steps.

306

You are a video-editing agent trained to interact with text-based editing software. Your task is to satisfy editing requests provided by a user. You have access to a set of functions, a timeline, which will be rendered at the end, a search panel, a corpus of videos that you will use to assemble the video requested by the user, and an audio transcription of the voice-over that will be played over your video. Your job is to satisfy the user's request as precisely as possible.

Here is a list of tools that you have available to you:
{function definitions}

{few-shot examples}

308

*FIG. 3*

You are a video editing critic interacting with an editor that carries out any feedback you give it. At the start, you will be provided a timeline that you may edit to your liking.

A timeline is a list of clips, each of which is represented by a dictionary that contains the name of the file, a description of the visual contents of the video, its duration in seconds, the cinematographic shot type most prevalent in the video, and the type of motion observed.

Your objective is to discover diverse and interesting tasks (that a human might give to an agent) by interacting with this editor through your feedback. Remember, the editor is imperfect, and the way you phrase your feedback matters. Be creative. 502

You are monitoring two agents interacting with each other in a text-based video editing software. One executes actions (such as searching for videos, adding them to the timeline, moving around clips in the timeline, and removing videos from the timeline), and the other provides feedback based on the resulting timeline. The task of the feedback-giving agent is to make sure the timeline is as close as possible to the one requested by the user.

Each timeline contains information on the name of the file, a description of the visual contents of the video, its duration in seconds, the cinematographic shot type most prevalent in the video, and the type of motion observed.

You are given the initial timeline, the final timeline after all sub-tasks are carried out, and each intermediate feedback provided by the feedback-giving agent. At the end of the sequence, the final timeline satisfies the user query.

User queries are given in terms of editing style, semantic content, and general descriptions of feeling and semiotics. Additionally, the user may have provided a target duration. However, the user has not seen the files in advance.

Your objective is to guess what the user query was based on the feedback of the agent and the timeline states. Ensure every piece of feedback meaningfully contributes to an aspect of the user query. 504

You are monitoring two agents interacting with each other in a text-based video editing software. One executes actions (such as searching for videos, adding them to the timeline, moving around clips in the timeline, and removing videos from the timeline), and the other provides feedback based on the resulting timeline. The task of the feedback-giving agent is to make sure the timeline is as close as possible to the one requested by the user.

Each timeline contains information on the name of the file, a description of the visual contents of the video, its duration in seconds, the cinematographic shot type most prevalent in the video, and the type of motion observed.

You are given the final timeline the agents produced and the original user query.

Your objective is to provide a score, from 1 to 5, of how well the user query was fulfilled in the timeline produced by the agents. Only give a score of 5 if the timeline perfectly fulfills what was asked for in the user query. 506

*FIG. 5A*

```
You are a video editing critic. You will receive a prompt of what the
editing of the video should look like, and a timeline with descriptions
and durations for each video. A timeline is a list of clips, each of which
is represented by a dictionary that contains the name of the file, a
description of the visual contents of the video, its duration in seconds,
the cinematographic shot type most prevalent in the video, and the type of
motion observed.

Your job is to ensure that the provided timeline follows the prompt as
closely as possible. Make sure it reasonably respects duration, pacing,
content, and coherence. You should output "render()" to render the video
when you consider the timeline is ready and satisfies the query.

Be concise when providing feedback.
Be harsh. Do not attempt to edit the timeline yourself, simply provide
high level feedback in terms of style and content.

Here is a list of tools that you have available to you:
{function definitions}

{few-shot examples}
```

508

FIG. 5B

MULTI-AGENT VIDEO EDITING SYSTEM

BACKGROUND

Video editing software enables content creators (e.g., movie directors, ad campaigners, social media influencers) to create compelling videos to engage with a target audience. While such software can allow access to a suite a powerful video editing tools, they can often be complex to use and require prior sophisticated training and experience.

SUMMARY

Introduced here are techniques/technologies that allow a multi-agent video editing system to generate a video timeline when given a video collection of video clips, a video timeline, and initial text instructions from a user describing a desired output video sequence.

More specifically, in one or more embodiments, a multi-agent video editing system includes multiple neural networks to perform automatic video editing of a video timeline given a high-level user directive. Each neural network, or agent, is a large language model specialized in different video editing tasks. In one or more embodiments, the agents are formulated as a critic agent and an editing agent. The editing agent module takes as input a video collection together with natural language text instructions and uses video editing tools to produce a modified video timeline. Example video editing tools include adding and removing video clips from the video timeline, searching through the video collection, etc. The critic agent takes as input the current video timeline and the high-level user directive. The critic agent outputs an assessment in natural language commenting on the quality of the current video timeline relative to the high-level directive. The assessment can then be sent back to the editing agent to provide the editing agent with instructions on how to improve the current version/edit of the video timeline. The multi-agent video editing system can output a rendered video sequence that satisfies the high-level user directive by iterating between the critic agent and the editing agent, which progressively improves the existing video timeline until the critic agent determines that the video timeline satisfies the high-level user directive and calls a renderer.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 3 illustrates example prompts for large language models used for a self-supervised exploration process for an editing agent module in accordance with one or more embodiments;

FIGS. 5A-5B illustrate example prompts for large language models used for a self-supervised exploration process for a critic agent module in accordance with one or more embodiments;

DETAILED DESCRIPTION

Figure 1:
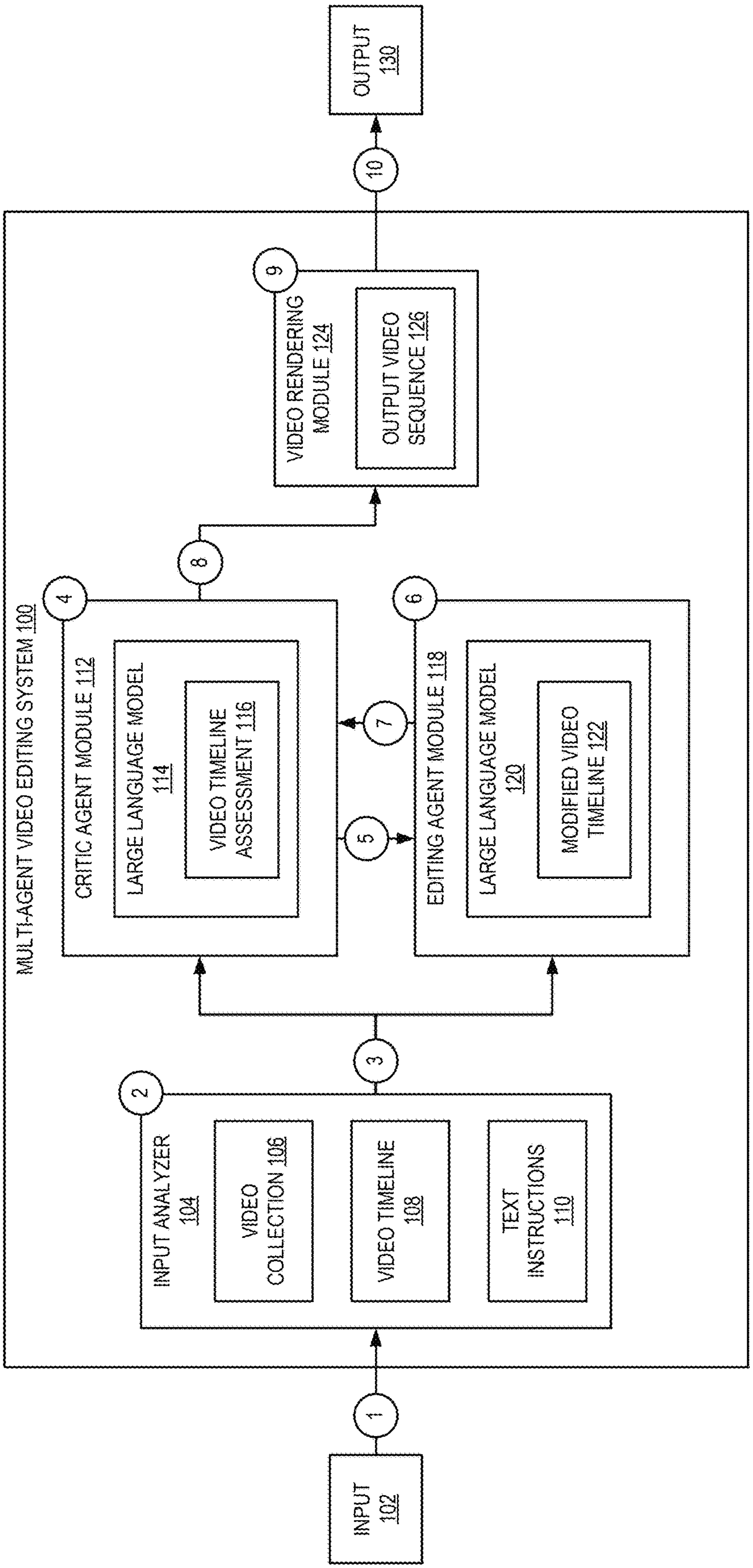
FIG. 1 illustrates a diagram of a process of generating a video timeline based on natural language text instructions using a multi-agent video editing system in accordance with one or more embodiments.

One or more embodiments of the present disclosure include a multi-agent video editing system that includes neural networks trained to collaboratively generate a video timeline of video clips based on a high-level user directive, instruction, or query.

Some existing techniques for machine-learning based video editing require specific user instructions that direct the system to perform specific tasks, with the user then being tasked to evaluate whether the user instructions were satisfied. However, these techniques can result in a poor user experience as they can be limited to the performance of the specific tasks indicated in the user instructions and require user interaction to perform further video editing operations beyond those in the user instructions. Other video editing techniques assemble video timelines responsive to receiving a text transcription of an audio sequence to be paired with the output video sequence. In one or more embodiments, the text transcription of the audio sequence is further used to search a corpus of video clips that match keywords from the audio transcription. These systems then assemble a video timeline using the matching results with the highest scores. However, these techniques can also be limited to performing specific video editing tasks and can be incapable of refinement absent further user interactions.

To address these and other deficiencies in conventional systems, the multi-agent video editing system of the present disclosure includes neural networks trained as agents collaboratively generate a video timeline of video clips from a video collection when given the video collection and natural language text instructions that include a user query. In one or more embodiments, a first neural network is trained to analyze the state of a video timeline to determine whether it satisfies a user query (e.g., a high-level user directive describing a requested output video sequence). If the first neural network determines that the video timeline does not satisfy the user query, the first neural network then generates an assessment, or feedback, that includes recommendations for modifications to the video timeline. The assessment is sent to a second neural network, which is trained to interpret the assessment and perform function calls for the performance of video editing operations to modify the video timeline based on the recommendations. The modified video timeline is then sent back to the first neural network for an updated assessment. If the first neural network determines the modified video timeline satisfies the user query, the first neural network causes the modified video timeline to be rendered. If the first neural network determines the modified video timeline does not satisfy the user query, the first neural network generates an updated assessment. This process can be performed iteratively until the first neural network determines the modified video timeline satisfies the user query.

The multi-agent video editing system of the present disclosure presents an improved video timeline assembly that addresses the limitations of the existing solutions. One advantage of the multi-agent video editing system of the present disclosure is that the neural network agents can collaboratively interact through natural language text to generate an output video timeline with minimal to no user interaction beyond the initial input query. This allows for the multi-agent video editing system to provide an enhanced user experience because it does not require a user knowledgeable in all aspects of video editing.

FIG. 1 illustrates a diagram of a process of generating a video timeline based on natural language text instructions using a multi-agent video editing system in accordance with one or more embodiments. As shown in FIG. 1, a multi-agent video editing system 100 receives an input 102, as shown at numeral 1. For example, the multi-agent video editing system 100 receives the input 102 from a user via a computing device or from a memory or storage location. In one or more embodiments, the input 102 includes a video collection 106, a video timeline 108, and text instructions 110. In one or more embodiments, the input 102 can be provided through the use of a graphical user interface (GUI). In one or more embodiments, the input 102 can be uploaded directly or the user can provide a URL to a location storing the input 102. For example, the text instructions 110 can be natural language text entered into a text box, or a user can indicate a storage location (e.g., on a computing device) or a URL to a location storing the text instructions 110. In one or more embodiments, the video collection 106, the video timeline 108, and the text instructions 110 can be provided in a single input 102, or multiple inputs 102.

In one or more embodiments, the video collection 106 can include a plurality of video clips. In one or more embodiments, each video clip is associated with information regarding the corresponding video clip. In one or more embodiments, the information is stored as metadata with the corresponding video clip. In some embodiment, the information can include a duration of the video clip, a text description of the video clip, a shot type classification, and a camera motion classification. In one or more embodiments, this information can be generated by multi-agent video editing system 100 or by systems external to, and then provided to, the multi-agent video editing system 100. In some embodiments, the text descriptions of the video clips in the video collection 106 can be generated by a vision-language model (VLM). For example, a VLM can be prompted to generate frame-level captions for each frame of a video at 1 frame per second (FPS), and then use an LLM to provide a summary of the whole video. In other embodiments, the text descriptions of the video clips can be user-generated In one or more embodiments, the shot type classification information and the camera motion classification information can be generated by one or more classifiers (e.g., a CLIP-based classifier). Examples of shot type classifications can include extreme close-up, close-up, medium close-up, medium, medium wide, wide, panoramic, long, etc. Examples of camera motion classifications can include static, drone, handheld, panning, etc.

In one or more embodiments, the video timeline 108 can include one or more video clips (e.g., either from the video collection 106 or not) in an ordered sequence that will be rendered. In other embodiments, the video timeline 108 can be an empty timeline that does not include any video clips. In embodiments where the video timeline 108 is not empty, each video clip in the video timeline 108 can be associated with data, such as a video clip identifier (e.g., a file name), a duration, a text description, a shot-type classification, and a camera motion classification.

In one or more embodiments, the text instructions 110 include natural language text that is a high-level user directive describing a desired video sequence to be created from the video clips in the video collection 106. In some embodiments, the text instructions 110 can include, at least, one or more semantic components, a brief description of a desired style, and duration of the desired video sequence. As an example, a text instruction 110 received in the input 102 can be: "Make a slow-paced, 61-seconds long, establishing sequence of the main character." The example text instruction 110 includes semantic components ("the main character"), a desired style ("slow-paced"), and a duration ("61-seconds long").

The multi-agent video editing system 100 includes an input analyzer 104 that receives the input 102. In some embodiments, the input analyzer 104 is configured to extract the video collection 106, the video timeline 108, and the text instructions 110 from the input 102, at numeral 2.

The input analyzer 104 then sends the video collection 106, the video timeline 108, and the text instructions 110 to a critic agent module 112 and an editing agent module 118, as shown at numeral 3. In one or more embodiments, the critic agent module 112 determines whether the video timeline 108 is sufficient in satisfying the query in the text instructions 110, at numeral 4. In one or more embodiments, the critic agent module 112 includes a large language model 114. In one or more embodiments, the large language model 114 is a neural network that has been fine-tuned to provide a video timeline assessment 116 in response to being given the video timeline 108 and the text instructions 110. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. In some embodiments, the large language model 114 can be the Llama3-8B-Instruct model, or other similar large language models.

In one or more embodiments, the critic agent module 112 can interact with a search engine. In such embodiments, as the number of videos in the video collection 106 may typically exceed the limits of the large language model 114, the critic agent module 112 can explore the corpus of videos in the video collection 106 through the search engine. In one or more embodiments, the limit of the search engine is five results at a time.

In one or more embodiments, the critic agent module 112 determines a similarity between the video timeline 108 and the query in the text instructions 110. In one or more embodiments, the critic agent module 112 is configured to provide one of two actions in the video timeline assessment 116: (1) provide feedback to the editing agent module 118 when the video timeline 108 is not sufficient in satisfying the query in the text instructions 110, or (2) indicate that the video timeline 108 is sufficient in satisfying the query in the text instructions 110 and end the process. In one or more embodiments, the critic agent module 112 can generate a score (e.g., from 1 to 5) to indicate how closely the video timeline 108 satisfies the query in the text instructions 110. When the score indicates the video timeline 108 does not closely satisfy the query in the text instructions 110, the critic agent module 112 generates the video timeline assessment 116. In one or more embodiments, the video timeline assessment 116 includes natural language text with instructions and/or suggestions on how to modify the video timeline 108 to satisfy more closely, or to be more similar to, the query in the text instructions 110. Continuing with the example text instructions 110 given above, when the video timeline 108 is empty, an example of the video timeline assessment 116 from the critic agent module 112 can be, "The timeline is empty. Start by adding a few videos of the main character playing the flute." When the video timeline 108 is not empty, examples of the video timeline assessment 116 from the critic agent module 112 can be, "This is a good start but the timeline is still too short. Add more videos of the man looking contemplative or introspective" or "Add more videos to the beginning to establish the main character, such as a mix of shots showcasing the main character's surroundings, such as the plants, decorations, and eclectic object."

In one or more embodiments, the critic agent module 112 sends the video timeline assessment 116 to the editing agent module 118, as shown at numeral 5. In one or more embodiments, the editing agent module 118 generates a modified video timeline 122 given the video timeline assessment 116 from the critic agent module 112, at numeral 6. In one or more embodiments, the editing agent module 118 includes a large language model 120. In one or more embodiments, the large language model 120 is a neural network that has been fine-tuned to perform function calling tasks. In some embodiments, the large language model 120 can be the Command-R-v1 model, or other similar large language models.

In one or more embodiments, the large language model 120 of the editing agent module 118 can execute one or more function calls for actions to be performed in a video non-linear editing environment to generate the modified video timeline 122. In one or more embodiments, the following functions are available to be called: search collection, add to timeline, remove from timeline, switch clip positions, move clip, and done. The search collection function takes in a query string, s, and returns a number of video clips from the video collection 106 with the highest CLIP similarity to the query string. The add to timeline function takes a video, c, and an index, i, and inserts the corresponding video at the given index of the video timeline 108. The remove from timeline function takes an index, i and removes the video at that position in the video timeline 108. The switch clip positions function takes two indices, i and j, and swaps the videos at each index in the video timeline 108. The move clip function takes a source index, i, and a target index, j, and moves the video at position i of the video timeline 108 to position j. In one or more embodiments, additional functions that can be performed by the editing agent module 118 can include: editing videos (e.g., in position, height, width, and/or duration), adding transitions between videos (e.g., cross-fades), decreasing or increasing the video speed of videos, text-to-video generation, adding music and sound effects, and generating music and sound effects.

In one or more embodiments, after the editing agent module 118 has completed the generation of the modified video timeline 122, the done function is executed. The done function takes no parameters and signals that the video timeline assessment 116 received from the critic agent module 112 has been satisfied. The modified video timeline 122 is then sent back to the critic agent module 112, as shown at numeral 7. The critic agent module 112 generates an updated video timeline assessment 116 based on the modified video timeline 122, the text instructions 110, and a history of previous assessments of the video timeline made by the critic agent module 112 (e.g., previous video timeline assessments). The updated video timeline assessment 116 can include additional instructions or recommendations for additional edits to the modified video timeline 122.

The process described with respect to numerals 4-7 can be iteratively repeated until the critic agent module 112 determines that the video timeline 108 is sufficient in satisfying the query in the text instructions 110 (e.g., the critic agent module 112 generates a score for the video timeline 108 or modified video timeline 122 that indicates that it closely matches the text instructions 110. In one or more embodiments, when the critic agent module 112 determines that the video timeline 108 is sufficient in satisfying the query in the text instructions 110, the critic agent module 112 issues a "render ( )" command. In response to the "render ( )" command, the modified video timeline 122 can then be sent to a video rendering module 124 to render the contents of the modified video timeline 122, as shown at numeral 8. The video rendering module 124 can then render the output video sequence 126 using the modified video timeline 122, at numeral 9.

After the video rendering module 124 generates the output video sequence 126 from the modified video timeline 122, the output video sequence 126 can be sent as an output 130, as shown at numeral 10. In one or more embodiments, the modified video timeline 122 can additionally, or alternatively, be sent as the output 130. In one or more embodiments, after the process described above in numerals 1-9, the output 130 is sent through a communications channel to the user device or computing device that provided the input requesting the modification to the video timeline 108, to another computing device associated with the user or another user, or to another system or application.

Figure 2:
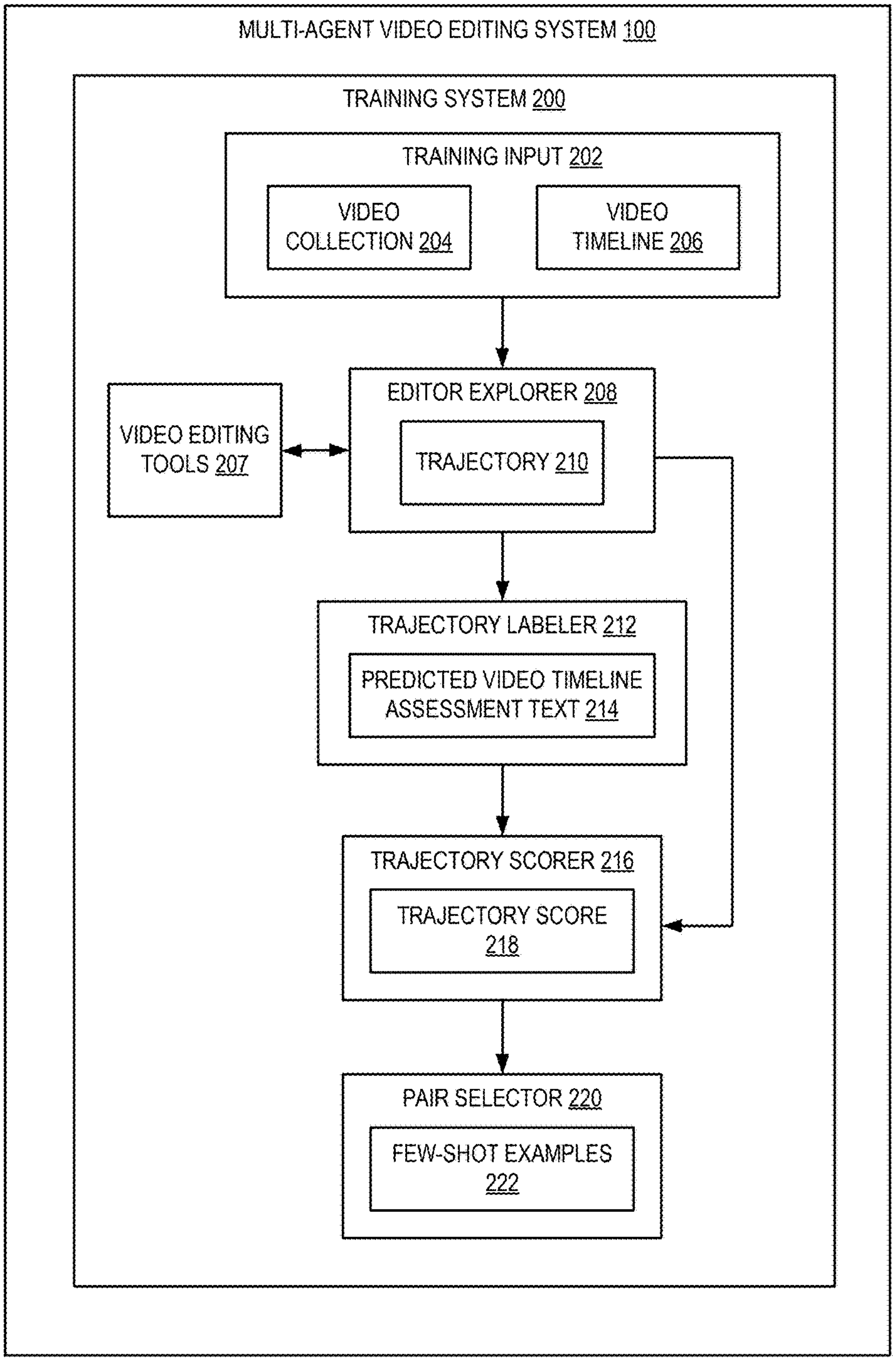
FIG. 2 illustrates a diagram of a self-supervised exploration process for an editing agent module in accordance with one or more embodiments.

FIG. 2 illustrates a diagram of a self-supervised exploration process for an editing agent module in accordance with one or more embodiments. As illustrated in FIG. 2, a multi-agent video editing system includes a training system 200. The training system 200 includes an editor explorer 208, a trajectory labeler 212, a trajectory scorer 216, and a pair selector 220. In one or more embodiments, the training system 200 performs a self-supervised exploration process to provide the editing agent module with few-shot examples on how to interpret messages (e.g., video timeline assessments 116). The self-supervised exploration process also allows the editing agent module to see an excerpt of a video collection via the few-shot examples. In such embodiments, this extends the multi-agent video editing system's understanding of the content and themes without using the whole video collection as part of the editing agent module's context.

In some embodiments, the training system 200 is a part of a multi-agent video editing system 100. In other embodiments, the training system 200 can be a standalone system, or part of another system, and deployed to the multi-agent video editing system 100. For example, the training system 200 may be implemented as a separate system implemented on electronic devices separate from the electronic devices implementing multi-agent video editing system 100. As shown in FIG. 2, the training system 200 processes a training input 202. For example, the multi-agent video editing system 100 receives the training input 202 from a user via a computing device or from a memory or storage location. The training input 202 can include video collection 204 and video timeline 206. In some embodiments, the training input 202 can further include an audio transcription.

The training input 202 and a set of video editing tools 207 are provided to the editor explorer 208. In one or more embodiments, the editor explorer 208 is a large language model that produces trajectories of actions and environment observations without any user guidance. In one or more embodiments, the editor explorer 208 is provided with a natural language prompt as initial guidance. FIG. 3 illustrates example prompts for large language models used for a self-supervised exploration process for an editing agent module in accordance with one or more embodiments. The example prompts in FIG. 3 are merely examples. Other prompts may also be used for the self-supervised exploration process for the editing agent module. Prompt 302 is an example prompt for the editor explorer 208. In one or more embodiment, the prompt for the editor explorer 208 can include information indicating what an editing agent module may receive or have access to, including a set of video editing tool functions, a video timeline, a search engine, and a corpus of videos that can be used to assemble a video sequence in the video timeline. The prompt for the editor explorer 208 can also include an objective for the editing agent module (e.g., "Discover diverse and interesting tasks (that a human might give to an agent) by interacting with the editing software through the given functions."). The editor explorer 208 is then allowed to freely explore the video non-linear editing environment by taking actions. At each iteration of this process, the editor explorer 208 produces a trajectory 210, t, as follows:

$$t=(o_0, a_0 o_1, a_1, \ldots o_n).$$

The trajectory 210 is a series, or list, of actions taken by the editor explorer 208, where $o_i$ is an observation of the state that includes the video timeline 206 and search results from the video collection 204 (if any), and optionally, the audio transcription, at step i, and $a_i$ is the action taken by the exploring agent after observing $o_i$.

The trajectory 210 is then provided to a trajectory labeler 212. In one or more embodiments, the trajectory labeler 212 is a large language model that is instantiated to produce or predict a plausible synthetic feedback (e.g., natural language text instructions) that would have elicited a given trajectory 210 produced by the editor explorer 208. In one or more embodiments, the trajectory labeler 212 is provided with a prompt as initial guidance (e.g., prompt 304 in FIG. 3). In one or more embodiments, the prompt for the trajectory labeler 212 can describe the inputs to be received by the trajectory labeler 212, including an initial video timeline, the final video timeline after one or more sub-tasks were carried out, and each intermediate change that each of the one or more sub-tasks made to the initial video timeline. The prompt can give the trajectory labeler 212 its objective (e.g., "Guess the feedback that was given to the editing agent module which led to modifying the original video timeline.").

In one or more embodiments, given a trajectory 210, $t_i$, at iteration i, the trajectory labeler 212 produces a predicted video timeline assessment text 214, $f_i$, that, when given to an editing agent module (e.g., editing agent module 118), would produce trajectory $t_i$.

Each predicted video timeline assessment text 214 and trajectory 210 pair is then provided to a trajectory scorer 216. In one or more embodiments, the trajectory scorer 216 is a large language model. In one or more embodiments, the trajectory scorer 216 is provided with a prompt as initial guidance (e.g., prompt 306 in FIG. 3). In one or more embodiments, the prompt for the trajectory scorer 216 can describe the inputs to be received by the trajectory scorer 216, including an initial video timeline, the final video timeline after one or more sub-tasks were carried out, each intermediate change that each of the one or more sub-tasks made to the initial video timeline, and the original user query (e.g., text instructions) that led to modifying the original video timeline. The prompt can give the trajectory scorer 216 its objective (e.g., "Provide a score, from 1 to 5, of how well the feedback was incorporated in the actions carried out by the agent.").

In one or more embodiments, the trajectory scorer 216 outputs a trajectory score 218 (e.g., from 1 to 5) for each pair, based on how well the predicted video timeline assessment text 214 is reflected in the trajectory 210 and on how efficient in terms of number of steps are in the trajectory 210, with a higher score indicating a better result. In one or more embodiments, the trajectory scorer 216 generates the trajectory score based on the number of steps in the trajectory (e.g., fewer steps to accomplish the predicted video timeline assessment text 214 can produce a higher score) and how well the predicted video timeline assessment text 214 is incorporated into the trajectory 210. A pair selector 220 then selects a number of pairs with the highest scores to be the few-shot examples 222 for the editing agent module. In one or more embodiments, the few-shot examples 222 can then be provided in a prompt (e.g., prompt 308) to train an editing agent module (e.g., editing agent module 118).

In one or more embodiments, to ensure that the editor explorer 208 uses a diverse number of the video editing tools and generates more diverse search queries, a noisy version of the trajectory exploration can be performed. In such embodiments, a large language model is first prompted to generate a set of 20 different search queries based on the video collection description and, optionally, the corresponding audio transcription. Then, during exploration, whenever the search collection function is called, the original query is replaced, with probability 0.5, with one of the 20 queries generated in the previous step. Additionally, whenever the add to timeline function is called, this action is replaced, with probability 0.1, with one of the less represented video editing functions, with random parameters.

In one or more embodiments, while the noisy version of the trajectory exploration provides reasonable examples on how to decompose feedback for the editing agent module (e.g., editing agent module 118), additional training can be performed to ensure effective communication between the editing agent module and the critic agent module (e.g., critic agent module 112). This additional training is described with respect to FIG. 4.

Figure 4:
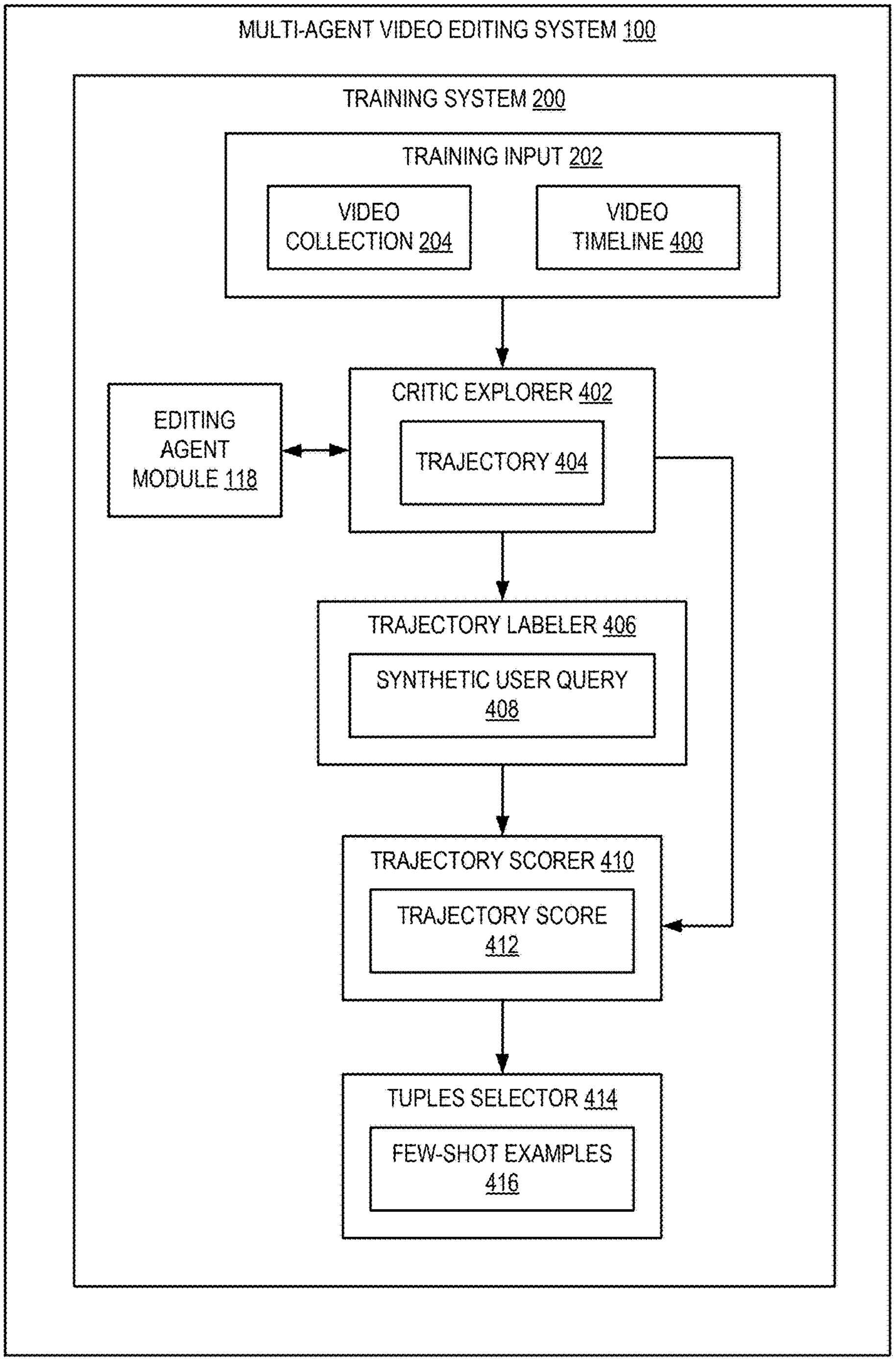
FIG. 4 illustrates a diagram of a self-supervised exploration process for a critic agent module in accordance with one or more embodiments.

FIG. 4 illustrates a diagram of a self-supervised exploration process for a critic agent module in accordance with one or more embodiments. As illustrated in FIG. 4, a multi-agent video editing system includes a training system 200. The training system 200 includes a critic explorer 402, a trajectory labeler 406, a trajectory scorer 410, a tuples selector 414, and an editing agent module 118. In one or more embodiments, the training system 200 performs a self-supervised exploration process to provide the critic agent module with few-shot examples on how to communicate. In one or more embodiments, the self-supervised exploration process described in FIG. 4 is performed to address issues that can occur if only the self-supervised exploration process described in FIG. 2 is performed: (1) there is no guarantee that the critic agent module (e.g., critic agent module 112) would produce feedback that is similar to the labels produced in the exploration process described in FIG. 2, and (2) there are no examples for the critic agent module of user queries or of feedback texts (e.g., video timeline assessments 116) that would produce editing agent module trajectories to gear the timeline closer to the desired query. The second self-supervised exploration process described in FIG. 4 addresses these issues to provide for more effective communication between the editing agent module and the critic agent module.

In one or more embodiments, the critic explorer 402 is provided with a prompt as initial guidance. FIGS. 5A-5B illustrates example prompts for large language models used for a self-supervised exploration process for a critic agent module in accordance with one or more embodiments. The example prompts in FIGS. 5A-5B are merely examples. Other prompts may also be used for the self-supervised exploration process for the critic agent module. Prompt 502 is an example prompt for the critic explorer 402. In one or more embodiment, the prompt for the critic explorer 402 can include information indicating that a critic agent module is interacting with an editing agent module that carries out video editing functions based on the feedback from the critic agent module, and that the critic explorer 402 receives a timeline that includes video clips. The prompt for the critic explorer 402 can also include an objective for the critic agent module (e.g., "Discover diverse and interesting tasks (that a human might give to an agent) by interacting with this editor through your feedback. Remember, the editor is imperfect, and the way you phrase your feedback matters.").

In one or more embodiments, the critic explorer 402 begins by observing the environment (e.g., the video collection 204 and a video timeline 400). In one or more embodiments, the video timeline 400 is randomly initialized with videos from the video collection 204. The critic explorer 402 is further given the instructions (e.g., predicted video timeline assessment text 214) selected as few shot examples through the editor exploration (as described in FIG. 2). For example, the critic explorer 402 can be initialized with ($o_o$, f) tuples for each of the best predicted video timeline assessment text 214 and trajectory 210 pairs as few-shot examples.

In one or more embodiments, the critic explorer 402 produces video timeline assessment text, or feedback that would improve the video timeline 400. In one or more embodiments, each video timeline assessment text at a given time step can be passed to an editing agent module 118 to execute the recommendation/instructions in the predicted video timeline assessment text 214 on the video timeline 400. In such embodiments, the editing agent module 118 has the in-context learning few-shot examples generated in the self-supervised exploration process for the editing agent module 118, as described in FIG. 2. The critic explorer 402 produces a trajectory 404, t, as follows:

$$t = (o_0, f_0, o_1, f_1, \ldots, o_n).$$

The trajectory 404 is a list of actions taken by the critic explorer 402, where $f_i$ is the video timeline assessment text generated by the critic explorer 402, at step i, and $o_i$ is an observation of the state of the video timeline 400 (e.g., a modified video timeline) as outputted by the editing agent module 118, after executing actions based on the video timeline assessment text generated by the critic explorer 402.

The trajectory 404 and the modified video timeline is then passed to the trajectory labeler 406. The trajectory labeler 406 is prompted to produce a synthetic user query 408 that would be satisfied by the modified timeline produced by the critic explorer 402. Prompt 504 is an example prompt for the trajectory labeler 406. In one or more embodiments, the prompt for the trajectory labeler 406 can describe the inputs to be received by the trajectory labeler 406, including an initial video timeline, the final video timeline after all sub-tasks are carried out, and each intermediate change that each of the one or more sub-tasks made to the initial video timeline. The prompt can also provide information to the trajectory labeler 406 indicating that the trajectory labeler 406 is monitoring two agents (e.g., a critic agent module and editing agent module) interacting with each other. The prompt can give the trajectory labeler 406 its objective (e.g., "Guess what the user query was based on the feedback of the agent and the timeline states.").

Each synthetic user query 408 and modified timeline pair is then provided to a trajectory scorer 410. In one or more embodiments, the trajectory scorer 410 is a large language model. In one or more embodiments, the trajectory scorer 410 is provided with a prompt as initial guidance (e.g., prompt 506 in FIG. 5A). In one or more embodiments, the prompt for the trajectory scorer 410 can describe the inputs to be received by the trajectory scorer 410, including the original user query (e.g., text instructions) and a final video timeline produced by the interactions between the critic agent module and editing agent module. The prompt can give the trajectory scorer 410 its objective (e.g., "Provide a score, from 1 to 5, of how well the user query was fulfilled in the timeline produced by the agents.").

The trajectory scorer 410 produces a trajectory score 412 (e.g., from 1 to 5), based on how well the modified timeline fulfills the requirements of the synthetic user query 408. A tuples selector 414 then selects a number of (o, f) tuples from the critic explorer 402 trajectories with the highest scores to be the few-shot examples 416 for the critic agent module. In one or more embodiments, the tuples with the highest scores will be the ones where the "render ( )" command is called when the timeline is close to the synthetic user query 408. In one or more embodiments, the few-shot examples 416 can then be provided in a prompt (e.g., prompt 508) to train a critic agent module (e.g., critic editing agent module 112).

Figure 6:
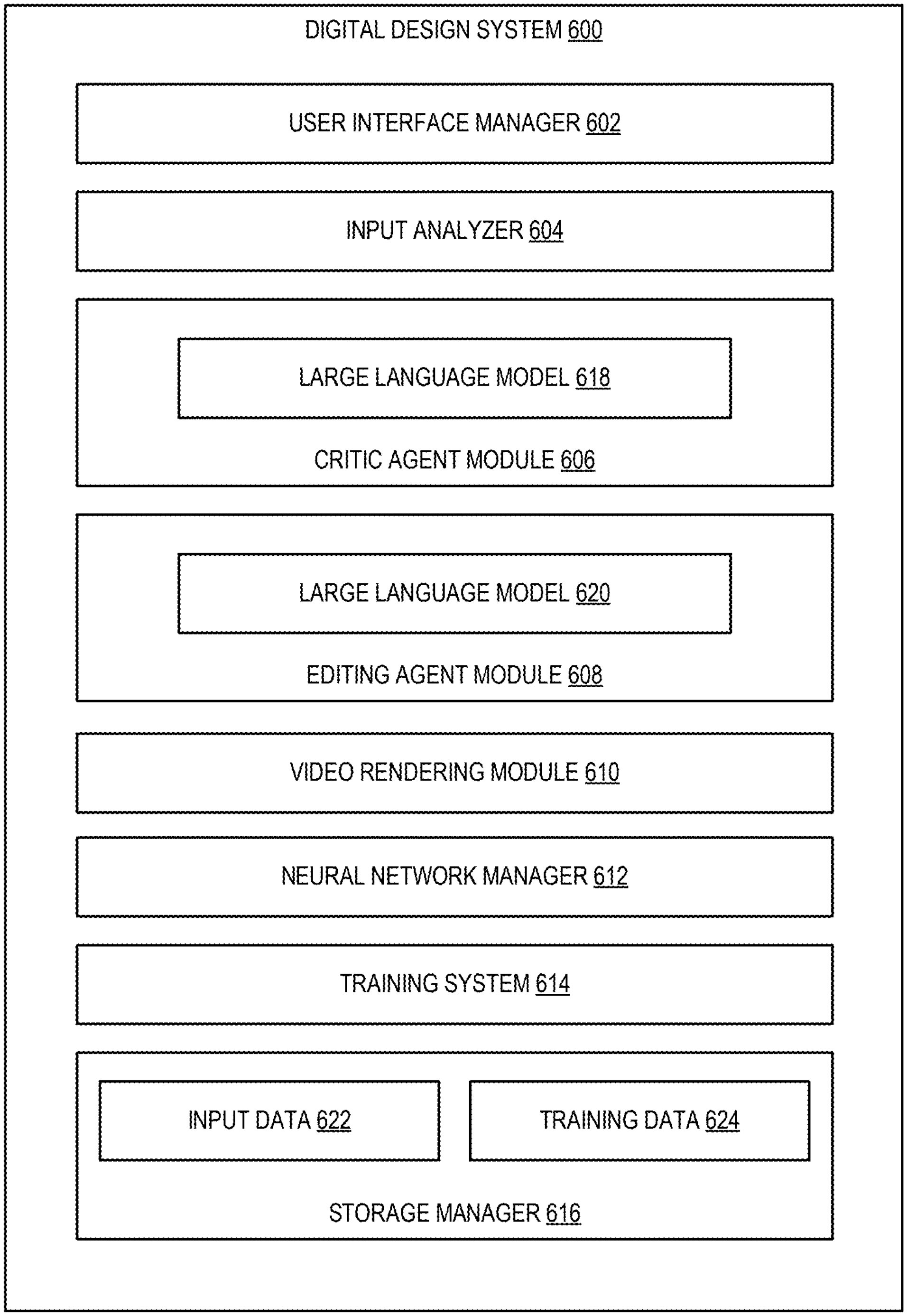
FIG. 6 illustrates a schematic diagram of a multi-agent video editing system in accordance with one or more embodiments.

FIG. 6 illustrates a schematic diagram of a multi-agent video editing system (e.g., "multi-agent video editing system" described above) in accordance with one or more embodiments. As shown, the multi-agent video editing system 600 may include, but is not limited to, a user interface manager 602, an input analyzer 604, a critic agent module 606, an editing agent module 608, a video rendering module 610, a neural network manager 612, a training system 614, and a storage manager 616. The critic agent module 606 includes a large language model 618 and the editing agent module 608 includes a large language model 620. The storage manager 616 includes input data 622 and training data 624.

As illustrated in FIG. 6, the multi-agent video editing system 600 includes a user interface manager 602. For example, the user interface manager 602 allows users to provide input data to the multi-agent video editing system 600. In some embodiments, the user interface manager 602 provides a user interface through which the user can upload one or more a video collection of digital media assets, a video timeline, and text instructions, as discussed above. Alternatively, or additionally, the user interface may enable the user to download one or more of the video collection, the video timeline, and the text instructions from a local or remote storage location (e.g., by providing an address (e.g., a URL or other endpoint) associated with a data source).

As further illustrated in FIG. 6, the multi-agent video editing system 600 also includes an input analyzer 604. The input analyzer 604 analyzes an input received by the multi-agent video editing system 600 to identify the video collection, the video timeline, and the text instructions.

As further illustrated in FIG. 6, the multi-agent video editing system 600 also includes a critic agent module 606. In one or more embodiments, the critic agent module 606 includes a large language model 618 trained to evaluate a video collection, a video timeline, and a text instructions and generate a video timeline assessment (e.g., feedback). The video timeline assessment can include recommendations or instructions on edits or modification that should be performed on the video timeline to better satisfy the text instructions. In one or more embodiments, the large language model 618 is a multimodal large language model, or a similar neural network. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

As further illustrated in FIG. 6, the multi-agent video editing system 600 also includes an editing agent module 608. In one or more embodiments, the editing agent module 608 includes a large language model 620 trained to evaluate a video collection, a video timeline, text instructions, and video timeline assessments from a critic agent module 606. Based on the evaluation, the editing agent module 608 can execute one or more video editing operations to modify the video timeline. The modified video timeline is then sent back to the critic agent module 606 for an updated evaluation and, if necessary, recommendations or instruction for additional modifications. In one or more embodiments, the large language model 620 is a multimodal large language model, or a similar neural network.

As further illustrated in FIG. 6, the multi-agent video editing system 600 also includes a video rendering module 610. In one or more embodiments, the video rendering module 610 is configured to render an output video sequence based on the contents of the video timeline produced by the critic agent module 606 and the editing agent module 608 that satisfies an initial query to the multi-agent video editing system 600. In one or more embodiments, the video rendering module 610 maps an identifier (e.g., a token, a file name, etc.) to a digital media asset (e.g., a video clip) in the video collection.

As illustrated in FIG. 6, the multi-agent video editing system 600 also includes a neural network manager 612. Neural network manager 612 may host a plurality of neural networks or other machine learning models, such as large language model 618, large language model 620, and other models used by the training system 614. The neural network manager 612 may include an execution environment, libraries, and/or any other data needed to execute the machine learning models. In some embodiments, the neural network manager 612 may be associated with dedicated software and/or hardware resources to execute the machine learning models. Although depicted in FIG. 6 as being hosted by a single neural network manager 612, in various embodiments the neural networks may be hosted in multiple neural network managers and/or as part of different components.

As illustrated in FIG. 6 the multi-agent video editing system 600 also includes training system 614. The training system 614 can teach, guide, tune, and/or train one or more neural networks. In particular, the training system 614 can train a neural network based on a plurality of training data. More specifically, the training system 614 can access, identify, generate, create, and/or determine training input and utilize the training input to train and fine-tune a neural network. In particular, the training system 614 can train, at least, large language model 618 of the critic agent module 606 and large language model 620 of the editing agent module 608.

As illustrated in FIG. 6, the multi-agent video editing system 600 also includes the storage manager 616. The storage manager 616 maintains data for the multi-agent video editing system 600. The storage manager 616 can maintain data of any type, size, or kind as necessary to perform the functions of the multi-agent video editing system 600. The storage manager 616, as shown in FIG. 6, includes input data 622 and training data 624. In particular, the input data 622 may include a video collection, a video timeline, text instructions (e.g., a user query for an output video timeline or output video sequence), and optionally, an audio transcription of audio to be overlayed over the output video sequence. The training data 624 can include a plurality of training datasets, as discussed in additional detail above. In particular, in one or more embodiments, each training dataset can include a training video collection, training video timelines, and optionally, training audio transcriptions utilized by the training system 614 to train one or more neural networks.

Each of the components 602-616 of the multi-agent video editing system 600 and their corresponding elements (as shown in FIG. 6) may be in communication with one another using any suitable communication technologies. It will be recognized that although components 602-616 and their corresponding elements are shown to be separate in FIG. 6, any of components 602-616 and their corresponding elements may be combined into fewer components, such as into a single facility or module, divided into more components, or configured into different components as may serve a particular embodiment.

The components 602-616 and their corresponding elements can comprise software, hardware, or both. For example, the components 602-616 and their corresponding elements can comprise one or more instructions stored on a computer-readable storage medium and executable by processors of one or more computing devices. When executed by the one or more processors, the computer-executable instructions of the multi-agent video editing system 600 can cause a client device and/or a server device to perform the methods described herein. Alternatively, the components 602-616 and their corresponding elements can comprise hardware, such as a special purpose processing device to perform a certain function or group of functions. Additionally, the components 602-616 and their corresponding elements can comprise a combination of computer-executable instructions and hardware.

Furthermore, the components 602-616 of the multi-agent video editing system 600 may, for example, be implemented as one or more stand-alone applications, as one or more modules of an application, as one or more plug-ins, as one or more library functions or functions that may be called by other applications, and/or as a cloud-computing model. Thus, the components 602-616 of the multi-agent video editing system 600 may be implemented as a stand-alone application, such as a desktop or mobile application. Furthermore, the components 602-616 of the multi-agent video editing system 600 may be implemented as one or more web-based applications hosted on a remote server. Alternatively, or additionally, the components of the multi-agent video editing system 600 may be implemented in a suite of mobile device applications or "apps."

As shown, the multi-agent video editing system 600 can be implemented as a single system. In other embodiments, the multi-agent video editing system 600 can be implemented in whole, or in part, across multiple systems. For example, one or more functions of the multi-agent video editing system 600 can be performed by one or more servers, and one or more functions of the multi-agent video editing system 600 can be performed by one or more client devices. The one or more servers and/or one or more client devices may generate, store, receive, and transmit any type of data used by the multi-agent video editing system 600, as described herein.

In one implementation, the one or more client devices can include or implement at least a portion of the multi-agent video editing system 600. In other implementations, the one or more servers can include or implement at least a portion of the multi-agent video editing system 600. For instance, the multi-agent video editing system 600 can include an application running on the one or more servers or a portion of the multi-agent video editing system 600 can be downloaded from the one or more servers. Additionally or alternatively, the multi-agent video editing system 600 can include a web hosting application that allows the client device(s) to interact with content hosted at the one or more server(s).

For example, upon a client device accessing a webpage or other web application hosted at the one or more servers, in one or more embodiments, the one or more servers can provide access to one or more files including a video collection, a video timeline, and text instructions stored at the one or more servers. Moreover, the client device can provide a request (i.e., via user input) to generate an output video sequence by modifying the video timeline using the video collection based on a description indicated by the text instructions. Upon receiving the request, the one or more servers can automatically perform the methods and processes described above. The one or more servers can provide an output video sequence to the client device for display to the user.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 8. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 8.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 8.

Figure 7:
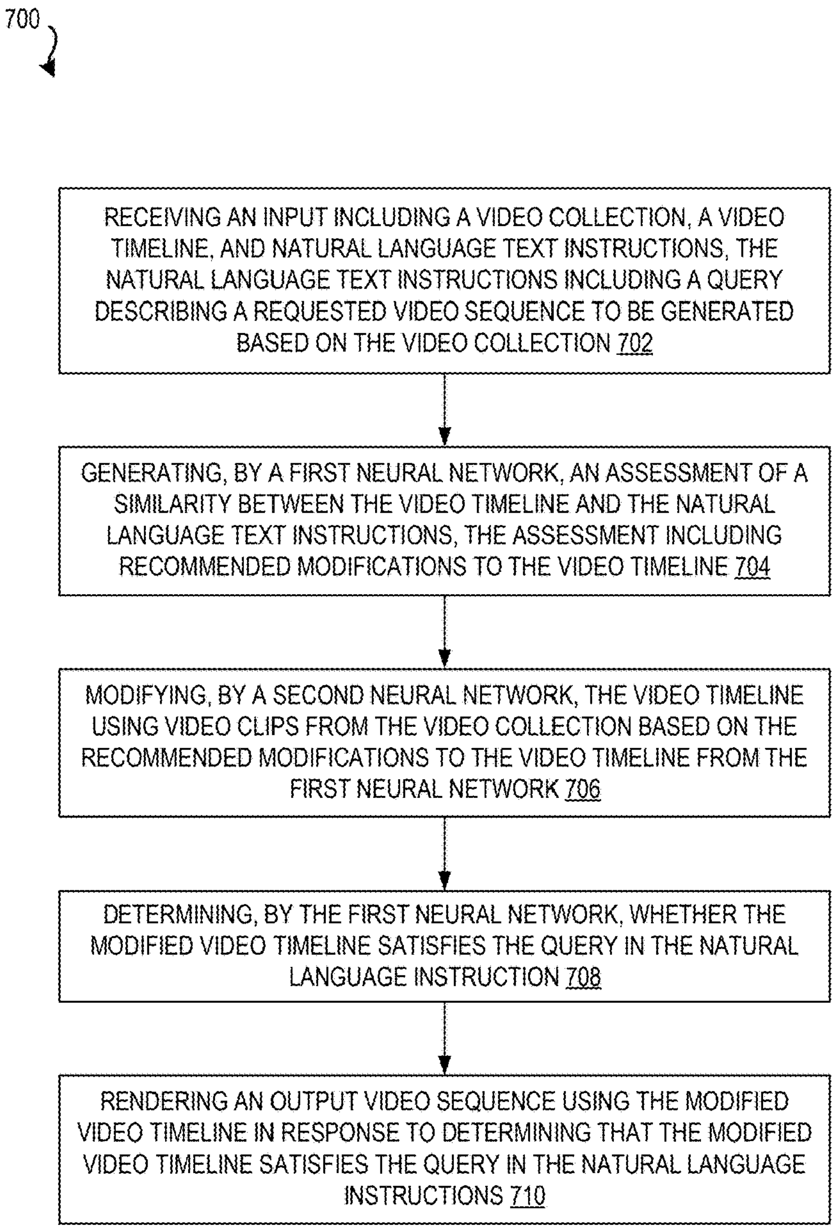
FIG. 7 illustrates a flowchart of a series of acts in a method of generating a video timeline from a video collection based on natural language text instructions using a multi-agent video editing system in accordance with one or more embodiments.

FIGS. 1-6, the corresponding text, and the examples, provide a number of different systems and devices that generate a video timeline of video clips based on natural language text instruction indicating a desired to an output video sequence. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of generating a video timeline from a video collection based on natural language text instructions using a multi-agent video editing system in accordance with one or more embodiments. In one or more embodiments, the method 700 is performed in a digital medium environment that includes the multi-agent video editing system 600. The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of receiving an input including a video collection, a video timeline, and natural language text instructions, the natural language text instructions including a query describing a requested video sequence to be generated based on the video collection. In one or more embodiments, the video collection, the video timeline, and the natural language text instructions are provided to the multi-agent video editing system for which a user is requesting a generation of, or modification to, the video timeline. In one or more embodiments, the input can also include an audio sequence, or a transcription of an audio sequence, which can be further used to guide the creation of the requested video sequence. In one or more embodiments, the multi-agent video editing system receives the input from a user (e.g., via a computing device). In one or more embodiments, the user may select or provide the input in an application, or the user may submit the input to a web service or an application configured to receive inputs.

In one or more embodiments, the video collection can include a plurality of video clips. In one or more embodiments, each video clip is associated with information regarding the corresponding video clip. In one or more embodiments, the information is stored as metadata with the corresponding video clip. In some embodiment, the information can include a duration of the video clip, a text description of the video clip, a shot type classification, and a camera motion classification. In one or more embodiments, the video timeline can include one or more video clips (e.g., either from the video collection or not) in an ordered sequence that will be rendered. In some embodiments, the video timeline can be an empty timeline that does not include any video clips. In embodiments where the video timeline is not empty, each video clip in the video timeline can be associated with data, such as a video clip identifier (e.g., a file name), a duration, a text description, a shot-type classification, and a camera motion classification. In one or more embodiments, the text instructions include natural language text describing a desired video sequence to be created from the video clips in the video collection 106. In some embodiments, the text instructions 110 can include, at least, one or more semantic components, a brief description of a desired style, and duration of the desired video sequence.

As illustrated in FIG. 7, the method 700 includes an act 704 of generating, by a first neural network, an assessment of a similarity between the video timeline and the natural language text instructions, the assessment of the video timeline including recommended modifications to the video timeline. In one or more embodiments, a neural network includes deep learning architecture for learning representations of audio and/or video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. In one or more embodiments, the first neural network is a critic agent module. In such embodiments, the first neural network is a large language model that has been fine-tuned to provide the assessment of the video timeline (e.g., feedback) in response to being given the video timeline and the text instructions. In some embodiments, the large language model can be the Llama3-8B-Instruct model, or other similar large language models.

In one or more embodiments, the first neural network is configured to provide the assessment of the video timeline based on its analysis of the video timeline and the text instructions. The assessment of the video timeline can either include feedback to a second neural network when the video timeline does not satisfy the query in the text instructions or indicate that the video timeline satisfies the query in the text instructions and generates a render call. In one or more embodiments, the feedback in the assessment of the video timeline includes natural language text with instructions and/or suggestions on how to modify the video timeline to satisfy the query in the text instructions. In one or more embodiments, if the video timeline is empty, the assessment of the video timeline can include recommendations to begin filling the video timeline with video clips from the video collection. If the video timeline is not empty, the assessment of the video timeline can include recommendations to modify the video timeline by adding, removing, or moving video clips. For example, the feedback can recommend to, or instruct, the second neural network to add or remove a specific video clip, describe a video clip that should be added, move video clips to different positions in the video timeline, or other video editing operations. When the first neural network has generated the assessment of the video timeline, the assessment can be sent to the second neural network.

As illustrated in FIG. 7, the method 700 includes an act 706 of modifying, by a second neural network, the video timeline using video clips from the video collection based on the recommended modifications to the video timeline from the first neural network. In one or more embodiments, the second neural network is an editing agent module. In such embodiments, the first neural network is a large language model fine-tuned to perform function calling tasks. In some embodiments, the large language model can be the Command-R-v1 model, or other similar large language models. In one or more embodiments, given the video collection, the video timeline, the text instructions, and the assessment of the video timeline from the first neural network, the second neural network can execute one or more function calls for video editing operations to be performed in a video non-linear editing environment to generate a modified video timeline. Example video editing function calls that can be made by the second neural network can include search the video collection, adding a video clip to the video timeline, remove a video clip from the video time, switching or swapping video clips, and moving a video clip. In one or more embodiments, additional functions that can be performed by the editing agent module can include editing videos (e.g., in position, height, width, and/or duration), adding transitions between videos (e.g., cross-fades), slowing down or increasing video speed of videos, text-to-video generation, adding music and sound effects, and generating music and sound effects. After performing the video editing operations, the second neural network sends the modified video timeline back to the first neural network for an updated assessment of the video timeline.

As illustrated in FIG. 7, the method 700 includes an act 708 of determining, by the first neural network, whether the modified video timeline satisfies the query in the natural language text instructions. In one or more embodiments, the first neural network performs an updated analysis of the modified video timeline to determine whether the modified video timeline more closely satisfies the query in the text instructions. When the first neural network determines that the modified video timeline does not satisfy the query in the text instructions, the first neural network generate updated/new recommendations for additional video edits to the modified video timeline. This process can repeat iteratively until the first neural network determines that the modified video timeline satisfies the query in the text instructions. When the first neural network determines that the modified video timeline satisfies the query in the text instructions, the first neural network can generate a render call to cause the modified video timeline to be rendered into an output video sequence.

As illustrated in FIG. 7, the method 700 includes an act 710 of rendering an output video sequence using the modified video timeline in response to determining that the modified video timeline satisfies the query in the natural language text instructions. In one or more embodiments, when the first neural network determines that the modified video timeline satisfies the query in the natural language text instructions, the modified video timeline is provided to a video rendering module. In one or more embodiments, the video rendering module is configured to render the contents of the modified video timeline to generate an output video sequence. In such embodiments, the video rendering module maps video clip identifiers (e.g., tokens, file names, etc.) in the modified video timeline to corresponding video clips in the video collection. After retrieving the video clips from the video collection, the video rendering module can render the output video sequence. In one or more embodiments, where the input to the multi-agent video editing system includes an audio sequence, the multi-agent video editing system generates a final output video sequence by pairing the audio sequence with the rendered output video sequence.

In some embodiments, the first neural network and the second neural network can be trained using few-shot examples generated using explorer neural networks. In one or more embodiments, the few-shot examples are generated by providing a dataset and a prompt to the explorer neural network. The dataset can include a video collection, a video timeline, and a set of video editing tools. The explorer neural network can generate a trajectory, which includes one or more actions performed by the explorer neural network using the dataset in response to the prompt. A trajectory labeler can then generate natural language text based on the generated trajectory, where the natural language text is a synthetic prompt that would have caused the explorer neural network to generate the trajectory. A trajectory scorer can then generate a score indicated how closely the natural language text matches the trajectory, with pairings that have a higher score selected as few-shot examples to train the first neural network and the second neural network.

For example, where the neural network being trained is a editing agent module, an editor explorer generates a trajectory using a video collection, a video timeline, and a set of video editing tools. In such embodiments, the trajectory includes one or more video editing operations performed on the video timeline using the video collection and a set of video editing tools. For example, the editor explorer is prompted to discover various diverse tasks that can be performed using the set of video editing tools. In response, the trajectory labeler generates predicted video timeline assessment text instruction based on the one or more video editing operations. The predicted video timeline assessment text instruction is an instruction that, if given to an editing agent module, is a type of feedback that would prompt the editor explorer to produce a corresponding video editing operation in the trajectory. The trajectory scorer then generates a score for each pairing of a video editing operation in the trajectory and a corresponding predicted video timeline assessment text instruction. For example, a predicted video timeline assessment text instruction that closely matches the performed video editing operation may be scored higher than other pairings that do not match as closely. Based on their scores, pairings can be selected as few-shot examples for training the editing agent module.

Where the neural network being trained is a critic agent module, a critic explorer generates a trajectory using a video collection, a video timeline, and predicted video timeline assessment text instructions. In one or more embodiments, the critic explorer generates predicted video timeline assessment text instructions. In some embodiments, the critic explorer can also obtain predicted video timeline assessment text instructions that were previously selected as few-shot examples in the editor explorer phase. In one or more embodiments, the critic explorer can access an editing agent module to perform modifications to the video timeline based on the predicted video timeline assessment text instructions. The critic explorer can then generate a trajectory by storing the video timeline assessment text instructions generated by the critic explorer and observations of the state of the video timeline as outputted by the editing agent module after executing actions indicated by the video timeline assessment text instructions. The critic explorer than generates natural language text based on a state of the modified video timeline. The natural language text can be a synthetic user query, which is a predicted instruction that would be satisfied by the state of the modified video timeline. The trajectory scorer then generates a score for each pairing of a synthetic user query and a corresponding modified video timeline. For example, a modified video timeline that closely matches the synthetic user query may be scored higher than other pairings that do not match as closely. Based on their scores, pairings can be selected as few-shot examples for training the critic agent module.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
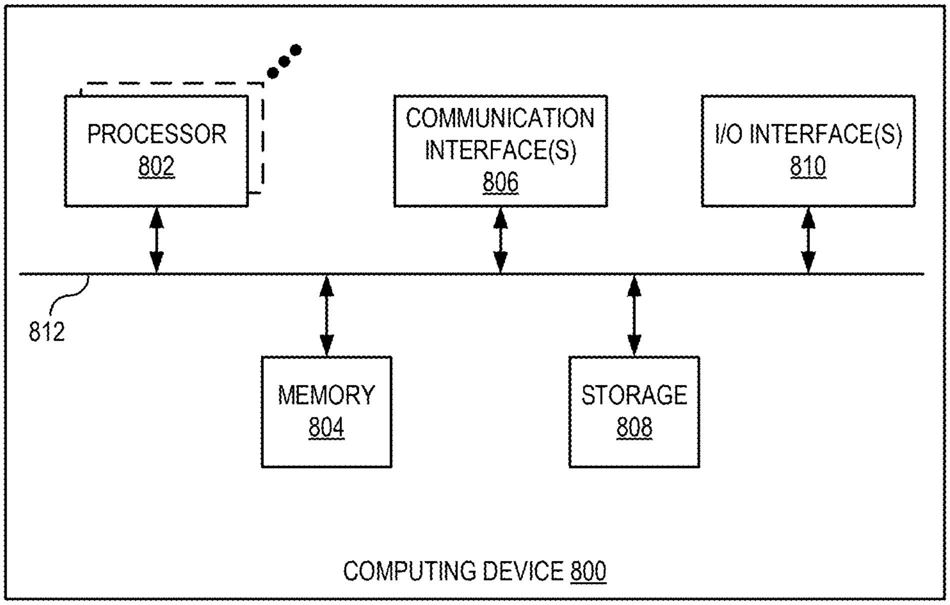
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the multi-agent video editing system. As shown by FIG. 8, the computing device can comprise a processor 802, memory 804, one or more communication interfaces 806, a storage device 808, and one or more I/O devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 that includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more input or output ("I/O") devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:

receiving an input including a video collection, a video timeline, and natural language text instructions, the natural language text instructions including a query describing a requested video sequence to be generated based on the video collection;

generating, by a first neural network, an assessment of a similarity between the video timeline and the natural language text instructions, the assessment including recommended modifications to the video timeline;

modifying, by a second neural network, the video timeline using video clips from the video collection based on the recommended modifications to the video timeline from the first neural network;

determining, by the first neural network, whether the modified video timeline satisfies the query in the natural language text instructions; and rendering an output video sequence using the modified video timeline in response to determining that the modified video timeline satisfies the query in the natural language text instructions.

2. The method of claim 1, wherein modifying the video timeline using the video clips from the video collection based on the recommended modifications to the video timeline from the first neural network further comprises:

performing video editing operations to the video timeline using the video clips from the video collection based on the assessment of the video timeline from the first neural network.

3. The method of claim 1, wherein each video clip in the video collection includes metadata, the metadata including a duration of a video clip, a text description, a shot type classification, and a camera motion classification.

4. The method of claim 1, wherein the first neural network and the second neural network are large language neural network models.

5. The method of claim 1, wherein determining whether the modified video timeline satisfies the query in the natural language text instructions further comprises:

analyzing the modified video timeline, a history of previous assessments of the video timeline, the natural language text instructions, and the video collection to determine an updated assessment of the similarity between the modified video timeline and the natural language text instructions;

in response to determining that the modified video timeline does not satisfy the natural language text instructions, providing the updated assessment to the second neural network, wherein the updated assessment includes additional recommended modifications to the modified video timeline; and modifying, by the second neural network, the video timeline using video clips from the video collection based on the additional recommended modifications to the video timeline from the first neural network.

6. The method of claim 1, wherein modifying the video timeline using the video clips from the video collection based on the recommended modifications to the video timeline from the first neural network further comprises:

receiving a transcription of an audio sequence to be paired with the requested video sequence; and generating search results from the video collection based on text descriptions of the video clips from the video collection and the transcription of the audio sequence.

7. The method of claim 6, wherein rendering the output video sequence using the modified video timeline in response to determining that the modified video timeline satisfies the query in the natural language text instructions further comprises:

generating a final output video sequence by pairing the audio sequence with the rendered output video sequence.

8. A non-transitory computer-readable medium storing executable instructions, which when executed by a processing device, cause the processing device to perform operations comprising:

receiving an input including a video collection, a video timeline, and natural language text instructions, the natural language text instructions including a query describing a requested video sequence to be generated based on the video collection;

generating, by a first neural network, an assessment of a similarity between the video timeline and the natural language text instructions, the assessment including recommended modifications to the video timeline;

modifying, by a second neural network, the video timeline using video clips from the video collection based on the recommended modifications to the video timeline from the first neural network;

determining, by the first neural network, whether the modified video timeline satisfies the query in the natural language text instructions; and rendering an output video sequence using the modified video timeline in response to determining that the modified video timeline satisfies the query in the natural language text instructions.

9. The non-transitory computer-readable medium of claim 8, wherein the instructions to modify the video timeline using the video clips from the video collection based on the recommended modifications to the video timeline from the first neural network further comprise:

performing video editing operations to the video timeline using the video clips from the video collection based on the assessment of the video timeline from the first neural network.

10. The non-transitory computer-readable medium of claim 8, wherein each video clip in the video collection includes metadata, the metadata including a duration of a video clip, a text description, a shot type classification, and a camera motion classification.

11. The non-transitory computer-readable medium of claim 8, wherein the first neural network and the second neural network are large language neural network models.

12. The non-transitory computer-readable medium of claim 8, wherein the instructions to determine whether the modified video timeline satisfies the query in the natural language text instructions further comprise:

analyzing the modified video timeline, a history of previous assessments of the video timeline, the natural language text instructions, and the video collection to determine an updated assessment of the similarity between the modified video timeline and the natural language text instructions;

in response to determining that the modified video timeline does not satisfy the natural language text instructions, providing the updated assessment to the second neural network, wherein the updated assessment includes additional recommended modifications to the modified video timeline; and modifying, by the second neural network, the video timeline using video clips from the video collection based on the additional recommended modifications to the video timeline from the first neural network.

13. The non-transitory computer-readable medium of claim 8, wherein the instructions to modify the video timeline using the video clips from the video collection based on the recommended modifications to the video timeline from the first neural network further comprise:

receiving a transcription of an audio sequence to be paired with the requested video sequence; and generating search results from the video collection based on text descriptions of the video clips from the video collection and the transcription of the audio sequence.

14. The non-transitory computer-readable medium of claim 13, wherein the instructions to render the output video sequence using the modified video timeline in response to determining that the modified video timeline satisfies the query in the natural language text instructions further comprise:

generating a final output video sequence by pairing the audio sequence with the rendered output video sequence.

15. A system comprising:

a memory component; and a processing device coupled to the memory component, the processing device to perform operations comprising:

providing a dataset and a prompt to an explorer neural network, the dataset including a video collection and a video timeline;

generating, by the explorer neural network, a trajectory which includes one or more actions performed by the explorer neural network using the dataset in response to the prompt;

generating, by a trajectory labeler, natural language text based on the generated trajectory, wherein the natural language text is a synthetic prompt intended to cause the explorer neural network to generate the trajectory; and training a neural network model using the natural language text and the trajectory.

16. The system of claim 15, wherein the one or more actions in the trajectory includes one or more video editing operations performed on the video timeline using the video collection and a set of video editing tools, wherein the generated natural language text is a predicted video timeline assessment text instruction based on the one or more video editing operations, and wherein the operations of training the neural network model using the natural language text and the trajectory further comprise:

generating a score for a pairing of a video editing operation from the trajectory and the predicted video timeline assessment text instruction; and selecting the pairing as a training input for an editing agent module based on the generated score, wherein the training input is used to train the editing agent module to perform video editing operations based on video timeline assessment text instructions.

17. The system of claim 16, wherein the predicted video timeline assessment text instruction is generated by a large language model, and wherein the predicted video timeline assessment text instruction represents a type of feedback that would prompt performance of the one or more video editing operations.

18. The system of claim 15, wherein the operations of generating the trajectory further comprise:

obtaining predicted video timeline assessment text instructions;

modifying the video timeline based on the predicted video timeline assessment text instructions using the video collection and a set of video editing tools; and storing the predicted video timeline assessment text instructions and a state of the modified video timeline after each predicted video timeline assessment text instruction is performed as the trajectory.

19. The system of claim 18, wherein the operations of generating the natural language text based on the generated trajectory further comprise:

generating a synthetic user query based on a state of the modified video timeline, wherein the synthetic user query is an instruction that would be satisfied by the state of the modified video timeline.

20. The system of claim 19, wherein the operations of training the neural network model using the natural language text and the trajectory further comprise further comprise:

generating a score for a pairing of the synthetic user query and the modified video timeline; and selecting the pairing of the synthetic user query and the modified video timeline as a training input for a critic agent module based on the generated score, wherein the training input is used to train the critic agent module to generate recommended modifications to the video timeline to satisfy queries in natural language text instructions.

* * * * *